(12) United States Patent
Hornsby et al.

(10) Patent No.: US 7,009,573 B2
(45) Date of Patent: Mar. 7, 2006

(54) COMPACT BIDIRECTIONAL REPEATERS FOR WIRELESS COMMUNICATION SYSTEMS

(75) Inventors: James J. Hornsby, Newbury Park, CA (US); Gary G. Sanford, Camarillo, CA (US); Kris Kelkar, Camarillo, CA (US); Shawn Aleman, Camarillo, CA (US); Vishwanaph G. Upadhye, Moorpark, CA (US)

(73) Assignee: Calamp Corp., Oxnard, CA (US)

( * ) Notice: Subject to any disclaimer, the term of this patent is extended or adjusted under 35 U.S.C. 154(b) by 324 days.

(21) Appl. No.: 10/640,224

(22) Filed: Aug. 12, 2003

(65) Prior Publication Data

US 2004/0160376 A1  Aug. 19, 2004

Related U.S. Application Data

(60) Provisional application No. 60/446,190, filed on Feb. 10, 2003, provisional application No. 60/454,733, filed on Mar. 13, 2003.

(51) Int. Cl.
*H01Q 13/10* (2006.01)
*H01B 7/14* (2006.01)

(52) U.S. Cl. .............. 343/770; 343/767; 343/727; 455/15; 455/16

(58) Field of Classification Search ........... 343/770, 343/767, 727, 729, 793, 795; 455/15–16, 455/24, 341, 450; H01Q 13/10; H04B 7/14
See application file for complete search history.

(56) References Cited

U.S. PATENT DOCUMENTS

| | | | |
|---|---|---|---|
| 4,052,662 A * | 10/1977 | Rau | 324/338 |
| 4,132,995 A * | 1/1979 | Monser | 343/767 |
| 4,259,642 A | 3/1981 | Derby | 330/288 |
| 4,587,524 A * | 5/1986 | Hall | 343/729 |
| 5,025,264 A * | 6/1991 | Stafford | 343/767 |
| 5,115,514 A | 5/1992 | Leslie | |
| 5,267,297 A | 11/1993 | Kawano et al. | |
| 5,349,694 A | 9/1994 | Kawano et al. | |
| 5,835,848 A | 11/1998 | Bi et al. | |
| 5,890,055 A | 3/1999 | Chu et al. | 455/16 |
| 5,963,847 A | 10/1999 | Ito et al. | |
| 6,246,675 B1 | 6/2001 | Beasley et al. | 370/342 |
| 6,385,435 B1 | 5/2002 | Lee | 455/24 |
| 6,507,320 B1 | 1/2003 | Von Stein et al. | 343/770 |
| 6,731,904 B1 | 5/2004 | Judd | |
| 6,745,003 B1 | 6/2004 | Maca | |
| 2004/0110469 A1 * | 6/2004 | Judd et al. | 455/15 |
| 2004/0166802 A1 | 8/2004 | McKay et al. | |

FOREIGN PATENT DOCUMENTS

| | | |
|---|---|---|
| EP | 0605182 A | 7/1994 |
| GB | 2266028 A | 10/1993 |
| JP | 2000-183797 | 6/2000 |

OTHER PUBLICATIONS

S. J. Kim, et al., "Adaptive Feedback Interference Cancellation System", 44(2), pp. 1–4.

* cited by examiner

*Primary Examiner*—Trinh Vo Dinh
(74) *Attorney, Agent, or Firm*—Koppel, Jacobs, Patrick & Heybl

(57) ABSTRACT

Compact bidirectional repeaters are provided for wireless communication systems. Their compact size is realized with repeater structures that include different-polarization antennas, back lobe suppressing structures, circuit feedback paths, antenna-feedback detectors, and automatic gain control.

47 Claims, 5 Drawing Sheets

COMPACT BIDIRECTIONAL REPEATERS FOR WIRELESS COMMUNICATION SYSTEMS

CROSS REFERENCES TO RELATED APPLICATIONS

This application claims the benefit of U.S. Provisional Application Ser. No. 60/446,190 filed Feb. 10, 2003 and of U.S. Provisional Application Ser. No. 60/454,733 filed Mar. 13, 2003.

BACKGROUND OF THE INVENTION

1. Field of the Invention

The present invention relates generally to signal repeaters for wireless communication systems.

2. Description of the Related Art

In a great number of wireless communication systems, communication signals flow between a central communication hub (e.g., a head end or base station) and a plurality of client communication structures or devices (e.g., a client personal communication system (PCS) or a client premises equipment (CPE).

In these systems, situations often arise in which the client communication device is beyond an optimum communication range of the communication hub so that its communication link is not satisfactory or is completely inoperative.

The communication range can be extended with a bidirectional signal repeater that has an upstream antenna for communication with the communication hub, a downstream antenna for communication with the client communication device, and amplifier structures that bidirectionally amplify signals between the downstream and upstream antennas.

However, it has generally been found that the downstream and upstream antennas must be separated by several signal wavelengths (e.g., as much as six feet) to reduce bidirectional feedback coupling between the antennas which otherwise initiates amplifier oscillation that disrupts communications rather than enhancing them. The resultant size increase has caused repeaters to typically be an unsatisfactory solution.

In addition, signal repeaters have generally provided service only for a single communication channel and have required significant circuit alterations to accommodate different channels.

BRIEF SUMMARY OF THE INVENTION

The present invention is directed to structures that facilitate the realization of compact (i.e., reduced volume) bidirectional repeaters for wireless communication systems. This reduction in size is achieved with repeater structures that include at least one of different-polarization antennas, back lobe suppressing structures, circuit feedback paths, antenna-feedback sensors, and automatic gain control.

The novel features of the invention are set forth with particularity in the appended claims. The invention will be best understood from the following description when read in conjunction with the accompanying drawings.

DETAILED DESCRIPTION OF THE INVENTION

FIGS. 1–5 illustrate embodiments of the present invention that facilitate the realization of compact bidirectional repeaters for wireless communication systems.

Figure 1:
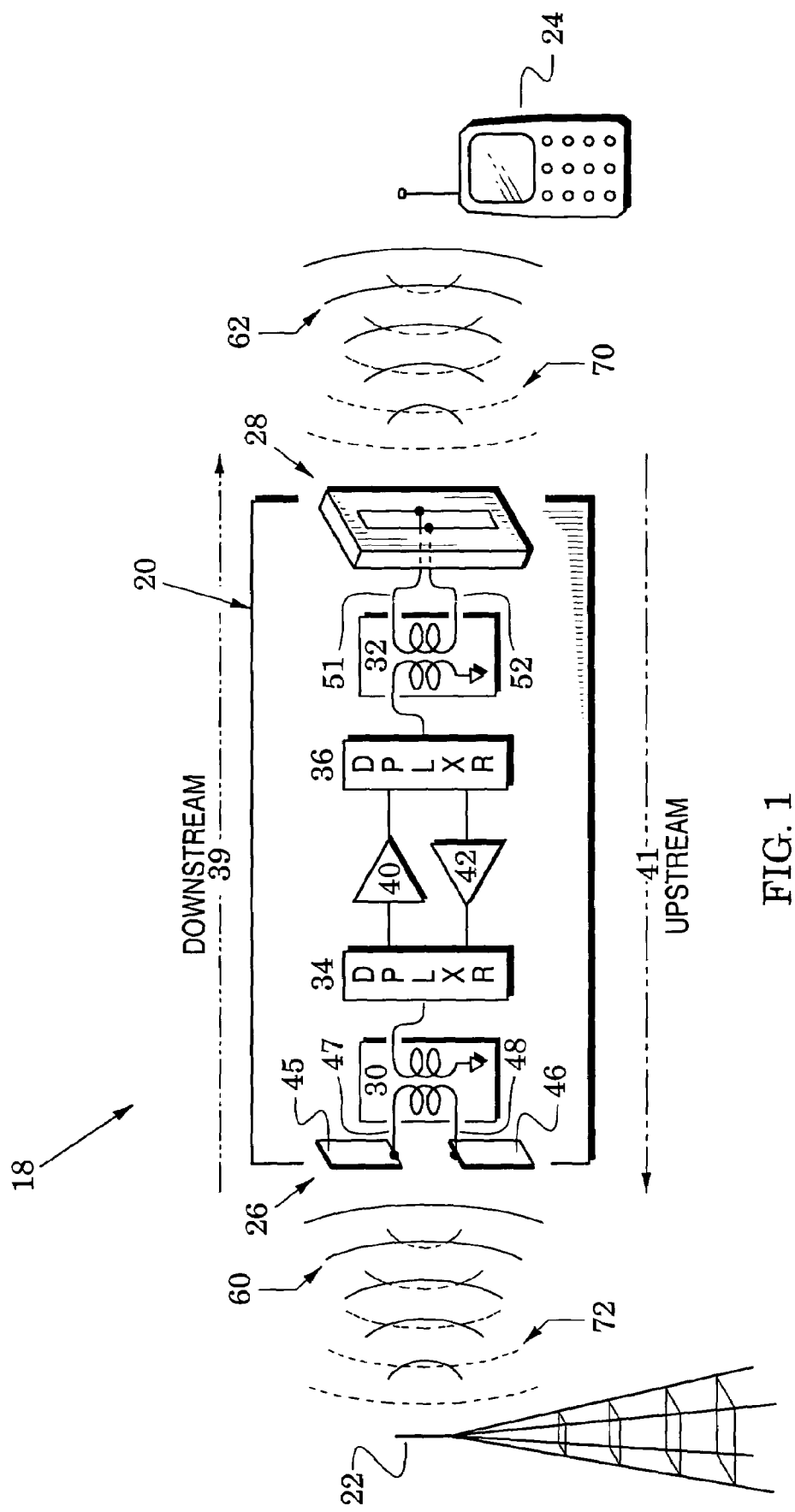
FIG. 1 is a schematic diagram of a wireless communication system that includes a bidirectional repeater embodiment of the present invention.

In particular, FIG. 1 illustrates a communication system 18 that includes a bidirectional repeater 20 which is positioned between a head end 22 (represented by its broadcasting/receiving tower) and a personal communication system (PCS) 24. The repeater 20 has signal-enhancing structure coupled between a vertically-polarized dipole antenna 26 and a horizontally-polarized slot antenna 28 by first and second baluns 30 and 32 (balun structures transform balanced signals to unbalanced signals) and first and second duplexers 34 and 36.

Figure 5:
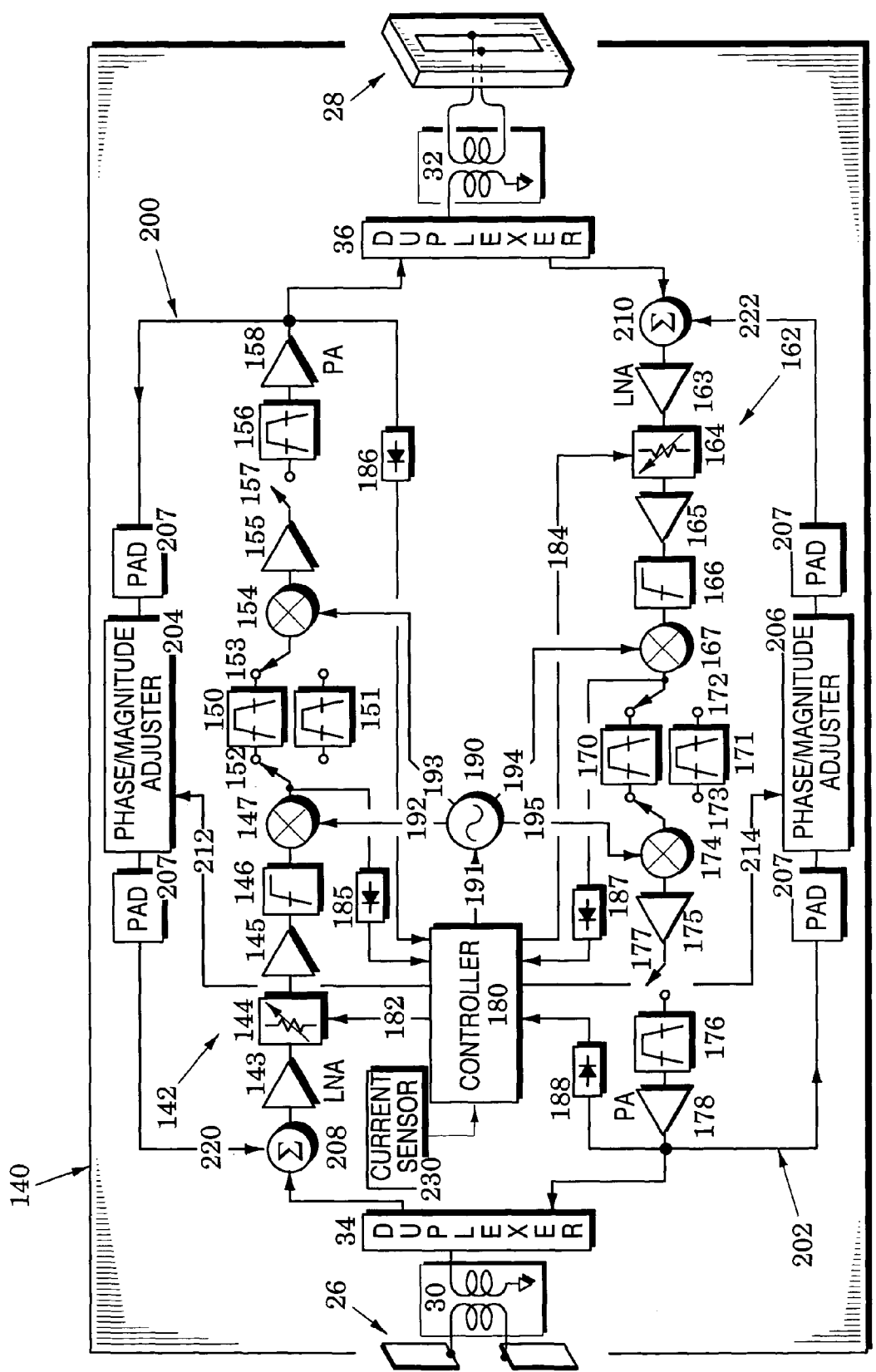
FIG. 5 is a repeater schematic that illustrates embodiments of the downstream and upstream signal-enhancing structures of FIG. 1.

In a downstream direction indicated by downstream arrow 39, the downstream signal-enhancing structure is represented by a downstream amplifier symbol 40. In an upstream direction indicated by upstream arrow 41, the upstream signal-enhancing structure is represented by an upstream amplifier symbol. Detailed embodiments of the downstream and upstream signal-enhancing structures are shown in FIG. 5 which is explored later in this description.

Mirror image conductors 45 and 46 form the vertically-polarized dipole antenna 26 and they are coupled to the first balun 30 by a balanced transmission line 47 and 48. The first duplexer 34 then couples the balun 30 to the amplifying structures 40 and 42. In addition, a second balanced transmission line 51 and 52 couples the horizontally-polarized slot antenna 28 to the second balun 32 and the second duplexer 32 couples the balun 32 to the amplifying structures 40 and 42.

In downstream operation of the repeater 20, a downstream signal 60 is received from the head end 22 by the vertically-polarized dipole antenna 26. This downstream signal is coupled through the first balun 30 and then routed through the first duplexer 34 to the downstream amplifying structure 40. The downstream amplifying structure 40 generates an enhanced downstream signal and it is routed through the second duplexer 36 and the second balun 32 to the horizontally-polarized slot antenna 28 which radiates the enhanced downstream signal 62 to the PCS 24.

In upstream operation of the repeater 20, an upstream signal 70 is received from the PCS 24 by the horizontally-polarized slot antenna 28. This upstream signal is coupled through the second balun 32 and then routed through the second duplexer 36 to the upstream amplifying structure 42. The upstream amplifying structure 42 generates an enhanced upstream signal and it is routed through the first duplexer 34 and the first balun 30 to the vertically-polarized dipole antenna 26 which radiates the enhanced upstream signal 72 to the head end 22.

Repeaters of the invention are especially useful in situations in which the PCS 24 cannot communicate or can only marginally communicate with the head end 22 for a variety of communication-related reasons (e.g., excessive distance from the head end and/or presence of intervening signal-blocking structures such as buildings and trees).

Typically, the downstream signal 60 is vertically polarized when it is initially radiated from the head end 22 but multiple reflections from intervening structures generally transform it into a randomly-polarized signal before it reaches the PCS 24. In addition, PCS users typically hold a PCS in a slanted orientation so that it responds equally well to vertically-polarized and horizontally-polarized signals. Accordingly, the horizontal polarization of the enhanced downstream signal 62 is suitable for reception by the PCS 24.

Figure 2:
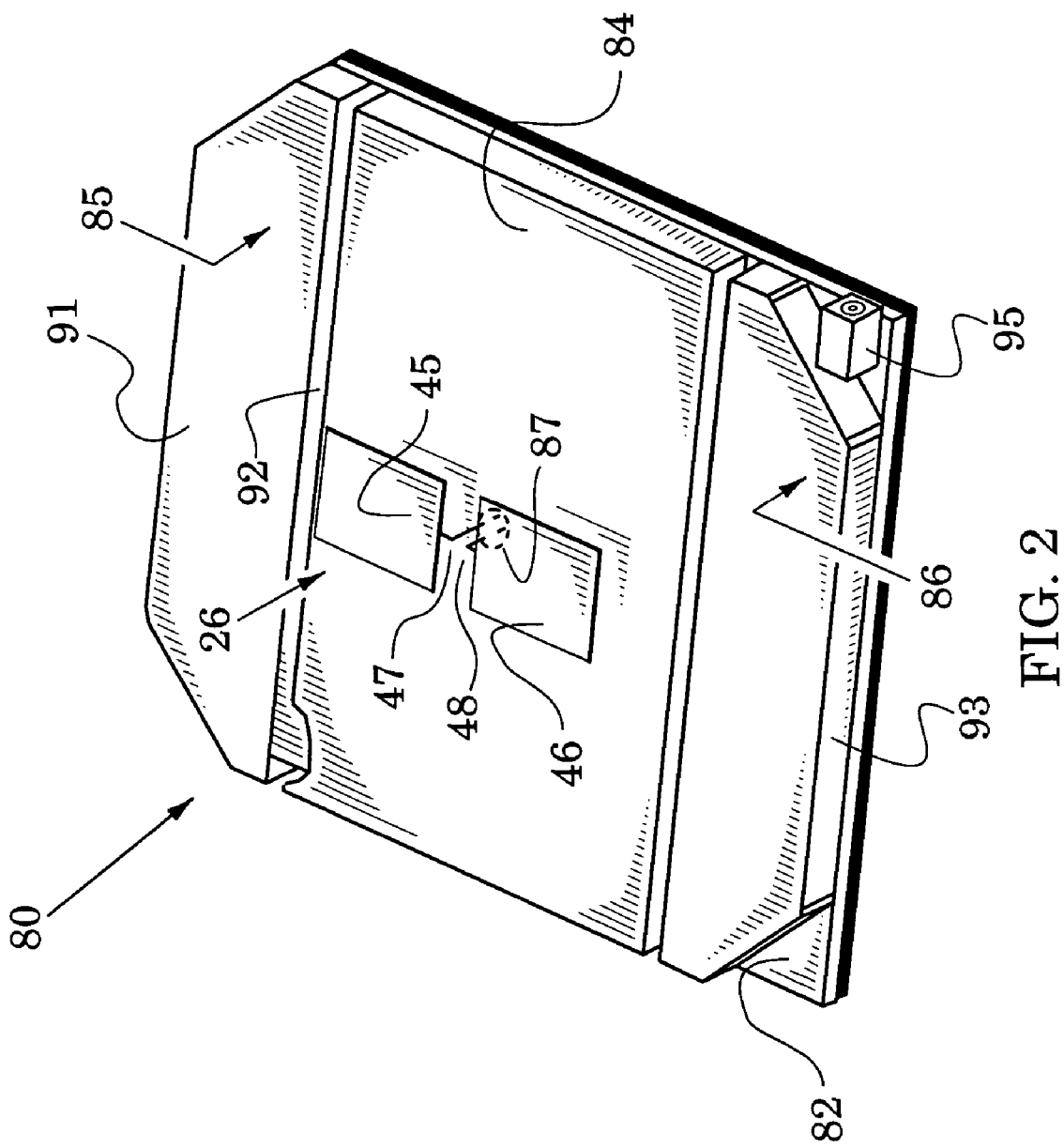
FIG. 2 is a perspective view of an embodiment of the repeater of FIG. 1 which particularly illustrates a vertically-polarized dipole antenna embodiment that facilitates downstream receive and upstream transmit functions in the system of FIG. 1.

An embodiment 80 of the repeater 20 of FIG. 1 is shown in FIG. 2 which illustrates a circuit board 82, a conductive wall structure 84, and upper and lower chokes 85 and 86. The conductors 45 and 46 of the dipole antenna 26 of FIG. 1 are spaced above the wall structure 84 which serves both as a reflective ground plane for the dipole and as a shielding cover for downstream and upstream signal enhancing structures.

In particular, the first and second baluns 30 and 32, the first and second duplexers 34 and 36 and the downstream and upstream amplifier circuits 40 and 42 of FIG. 1 are carried on the circuit board 82 of FIG. 2 and positioned beneath the wall structure 84. The balanced transmission line 47 and 48 of FIG. 1 is fed through an aperture 87 in the wall structure 84 so that it can reach the first balun 30 which is below the wall structure.

In one embodiment, the dipole antenna 26 is spaced 0.25 wavelength above the wall structure, but other embodiments reduce the spacing (e.g., to 0.16 wavelength) to thereby reduce the overall size of the repeater 20 of FIG. 1. It has been found that this reduction does not significantly compromise the beam shape or bandwidth of the received and transmitted signals.

The length of the balanced transmission line 47 and 48 is preferably close to a quarter wavelength (e.g., 0.16 wavelength above the wall structure 84 and 0.07 wavelength from the wall structure to the circuit board below) so that it acts as a transmission line transformer. A simple adjustment of the transmission line impedance can be easily made to match the dipole antenna 26 to the input impedance of the first balun (30 in FIG. 1).

In an important feature of the invention, the dipole antenna 26 and the slot antenna 28 of FIG. 1 are respectively vertically and horizontally polarized. This orthogonal polarization provides substantial isolation between the antennas and this isolation is maintained by insuring that their polarizations have high purity which is achieved with balanced feed structures and with symmetry in the conductive surfaces of the repeater.

To insure that the feeds are well balanced, the baluns 30 and 32 of FIG. 1 should be carefully constructed to enhance their phase and amplitude control. An exemplary balun structure is a simple half wavelength of microstrip line on the circuit board 82 of FIG. 2 which is simple to manufacture and is thus a cost-effective choice.

Although the invention can be realized with various antenna elements that exhibit good polarization purity, an exemplary one is the dipole antenna 26 and its associated ground plane that is formed by the wall structure 84. Realizations of this antenna have typically generated a relatively narrow elevation beamwidth (e.g., approximately 65°) and a broader azimuthal beamwidth (e.g., approximately 90°) which has been found to be a favorable beam shape.

Although orthogonally polarized antennas achieve high isolation in an anechoic environment, it has been found in typical service environments that the back lobe of one antenna can be reflected, with significant loss of polarization purity, rearward into the main lobe of the other antenna. This reflection and the associated loss of polarization purity substantially degrades the antenna isolation.

In another important feature of the invention, it has been determined that the back lobes are principally generated by diffraction from ground plane edges and they can be substantially reduced by suppressing the flow of surface current toward these edges. Accordingly, the invention provides the upper and lower chokes 85 and 86 which are cavity-backed slots. In particular, each choke is configured to form a cavity 91 and to be spaced from the wall structure 84 to define a slot 92 that couples to the cavity 91.

The wall structure is partially broken away in FIG. 2 to better show the interior of the cavity 91 which is preferably a quarter wavelength deep and shorted at a cavity end wall (similar to the end wall 93 of the choke 86) to thereby present a high impedance at the slot 92 which passively and electromagnetically couples the choke to the dipole antenna. The high impedances of the chokes 91 and 92 significantly suppress the flow of surface current upward and downward from the dipole antenna 26 to thereby substantially reduce its antenna back lobe.

As stated above, the downstream and upstream amplifier circuits 40 and 42 of FIG. 1 are carried on a circuit side of the circuit board 82 which is protected by the wall structure 84. Electrical power for these circuits is brought in through a connector housing 95.

Figure 3:
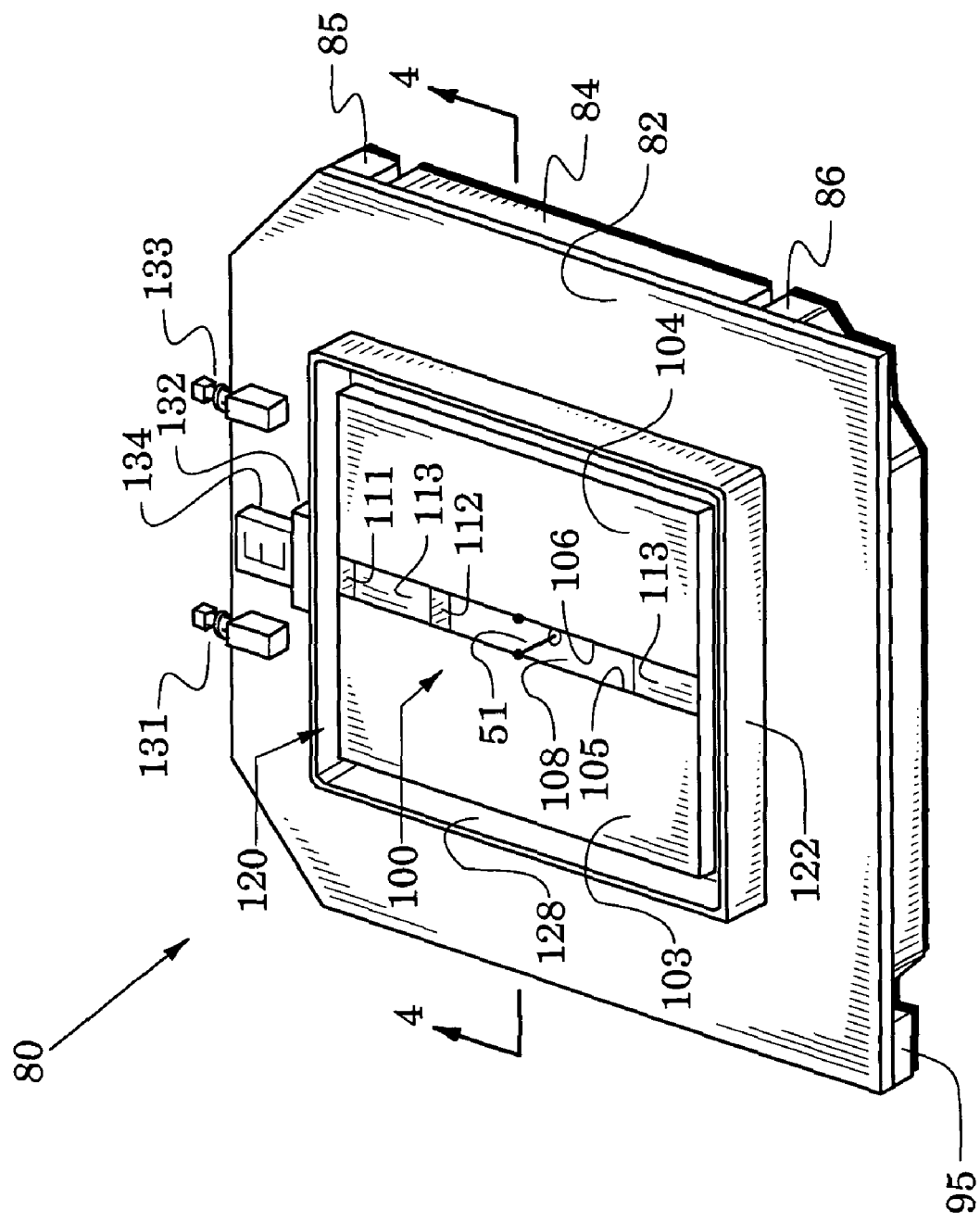
FIG. 3 is another perspective view of the repeater of FIG. 2 which particularly illustrates a horizontally-polarized slot antenna embodiment that facilitates downstream transmit and upstream receive functions in the system of FIG. 1.
Figure 4:
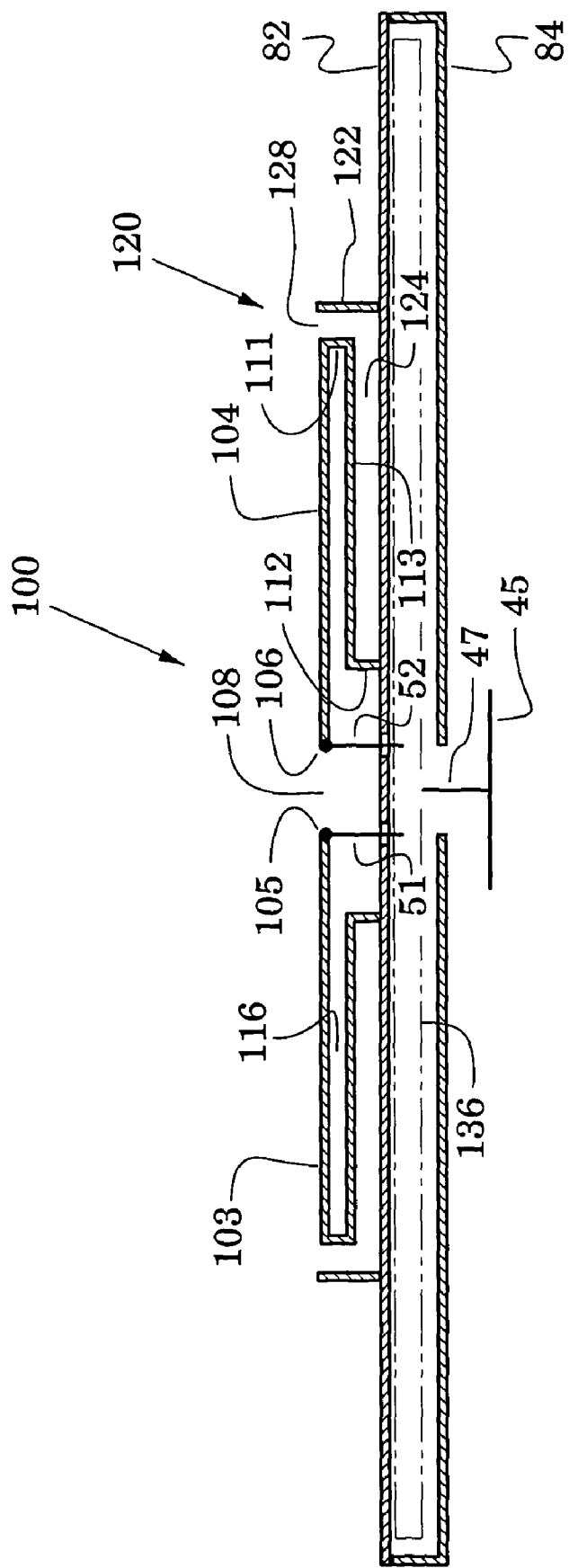
FIG. 4 is a cross-section view along the plane 4—4 of the repeater embodiment of FIG. 3.

FIG. 3 is a perspective view of the other side of the repeater 80 of FIG. 2 and FIG. 4 is a sectional view along the plane 4—4 of FIG. 3. As described above with reference to FIG. 2, the repeater has a circuit board 82, a conductive wall structure 84, and upper and lower chokes 85 and 86 which are all indicated in FIGS. 3 and 4. An embodiment 100 of the horizontally-polarized slot antenna is also formed on this side of the repeater.

In particular, the slot antenna embodiment 100 is realized with a conductive member that is configured to form faces 103 and 104 that terminate in edges 105 and 106 that define a slot 108. The conductive member is further configured to form first and second walls 111 and 112 that are orthogonal to the faces 103 and 104 and that are connected together by a third wall 113 that is parallel to the faces 103 and 104. The first wall 111 is a continuation of the faces 103 and 104 and the second wall 112 is shorted to the conductive back of the circuit board 82. Thus, the faces 103 and 104 and the walls 111, 112 and 113 form a continuous cavity 116 that extends away from each side of the slot and also passes underneath the top and bottom of the slot 108 to thereby configure the antenna 100 as a cavity-backed slot antenna.

The balanced transmission line 51, 52 of FIG. 1 extends downward from the slot edges 105 and 106, passes through apertures in the circuit board 82 and couples to the balun 32 of FIG. 1 which is formed on the circuit side of the circuit board in a manner similar to that described above for the balun 30.

Realizations of the horizontally-polarized cavity-backed slot antenna 100 have typically generated beams whose shapes are similar to those for the vertically-polarized dipole antenna 26 of FIG. 2. For example, the cavity-backed slot antenna typically generates an elevation beamwidth of approximately 65° and an azimuthal beamwidth somewhat less than 90°.

In another important feature of the invention, the back lobes of the cavity-backed slot antenna 100 have been significantly suppressed by supplementing the antenna with a continuous choke 120 that surrounds the antenna 100. The choke is configured by the addition of a continuous conductive wall 122 that rises from the conductive back of the circuit board 82 and is spaced from the first wall 111. The second and third walls 112 and 113 thus combine with the conductive back of the circuit board 82 to define a continuous cavity 124. This cavity is extended between the first wall 111 and the conductive wall 122 to a cavity opening 128 which is in the plane of the faces 103 and 104.

The second wall 112 represents a short and the cavity 124 is preferably close to a quarter wavelength in depth which transforms the short into a high impedance which is electromagnetically presented to the cavity-backed slot antenna 100 at the continuous opening or slot 128. This high impedance significantly suppresses the flow of surface current outward from the antenna to thereby substantially reduce its back lobe.

As shown in FIG. 3, the repeater 80 includes various supplemental control structures 131, 132, 133, 134 which are described below with reference to FIG. 5. The choke 120 is thus configured to lie largely under the cavity-backed slot antenna 100 and be spaced inward to clear the control structures 131, 132, 133, 134. In other repeater embodiments, however, the choke can be spaced further outward (e.g., to the perimeter of the circuit board 82).

The conductor 45 of the dipole antenna 26 is shown in FIG. 4 along with its respective portion 47 of the balanced transmission line of FIG. 2. This transmission line and the balanced transmission line 51, 52 are in position to be connected to respective baluns and through them, to the remaining signal-enhancing circuits that are carried on the circuit side of the circuit board 82. These circuits are generally indicated by a broken-line box 136 in FIG. 4.

The schematic of FIG. 5 illustrates another repeater embodiment 140 which includes the vertically-polarized dipole antenna 26, first balun 30, first duplexer 34, second duplexer 36, second balun 32, and horizontally-polarized slot antenna 28 of FIG. 1. The schematic further illustrates embodiments of the downstream signal-enhancing structure and upstream signal-enhancing structure that were respectively represented in FIG. 1 with a downstream amplifier symbol 41 and an upstream amplifier symbol 42.

The downstream signal-enhancing structure 142 (beginning at the duplexer 34) includes the series combination of a low noise amplifier (LNA) 143, a variable attenuator 144, an amplifier 145, a high-pass filter 146, a downconverter mixer 147, bandpass filters 150 and 151 and associated switches 152 and 153, an upconverter mixer 154, an amplifier 155, a bandpass filter 156 with associated switch 157, and a power amplifier (PA) 158.

The upstream signal-enhancing structure 162 (beginning at the duplexer 36) includes the series combination of an LNA 163, a variable attenuator 164, an amplifier 165, a high-pass filter 166, a downconverter mixer 167, bandpass filters 170 and 171 and associated switches 172 and 173, an upconverter mixer 174, an amplifier 175, a bandpass filter 176 with associated switch 177, and a PA 178.

A controller 180 is included in the repeater 140 and it provides automatic gain control (AGC) signals 182 and 184 to set the attenuation of the variable attenuators 144 and 164. In addition, the controller receives signal-strength indications from signal detectors 185 and 186 that are respectively coupled to the outputs of the downconverter mixer 147 and the PA 158 and also receives signal-strength indications from signal detectors 187 and 188 that are respectively coupled to the outputs of the downconverter mixer 167 and the PA 178.

The controller 180 also provides control signals 191 to a voltage-controlled oscillator (VCO) 190 that, in response, provides local oscillator signals 192 and 193 to the downconverter and upconverter mixers 147 and 154 and provides local oscillator signals 194 and 195 to the downconverter and upconverter mixers 167 and 174. The controller may be realized, for example, with an array of gates, a suitably-programmed digital processor or a combination of these elements.

In operation of the downstream signal-enhancing structure 142, downstream signals from the head end 22 of FIG. 1 are received through the vertically-polarized dipole antenna 26 and routed through the duplexer 34 for amplification by the LNA 143. After further amplification by the amplifier 145 and filtering by the high-pass filter 146, the downstream signals are downconverted by the mixer 147 and provided to a plurality of channel filters which are represented, in this embodiment, by the two bandpass filters 150 and 151. The downconverted and filtered downstream signals are upconverted in the mixer 154, amplified in the amplifier 155, filtered in the bandpass filter 156 and finally amplified in the PA 158. The enhanced downstream signal is then routed through the duplexer 36 and the balun 32 to the horizontally-polarized slot antenna 28 for radiation to the PCS 24 of FIG. 1.

In an illustrative example, the downstream signals (60 in FIG. 1) may be a plurality of channels positioned in the downstream band of 1850 to 1910 MHz. In this example, the high-pass filter 146 passes signals higher than 1400 MHz and they are downconverted with a local oscillator signal 192 of 1477.5 MHz. In this example, the switches 152 and 153 select the bandpass filter 150 which has a bandwidth of 20 MHz centered at 380 MHz.

Thus, a downstream channel at 1857.5 MHz (in the band of 1850 to 1910 MHz) is downconverted and passed through the bandpass filter 150. Although an image downstream signal at 1097.5 MHz could be upconverted in the mixer 147 to a mixer product at 380 MHz which would pass through the bandpass filter 150, this image product is prevented by the low-pass filter 146 which substantially removes this "negative image".

After channel selection, the downconverted signal at 380 MHz is upconverted with a local oscillator signal 193 of 1477.5 MHz and, after amplification by the amplifier 155, the upper conversion image at 1857.5 MHz is selected by the bandpass filter 156 (the switch 157 is closed during this operation). Finally, the downstream signal is amplified to an enhanced level for radiation through the horizontally-polarized slot antenna 28.

The controller 180 monitors the signal strength sent to the antenna 28 via the signal detector 186 and adjusts (via the AGC signal 182) the variable attenuator 144 to thereby set the level (e.g., +20 dBm) of the downstream signal. In a feature of the invention, this AGC control can be used to restrict the signal out of the slot antenna 28 to levels that reduce back lobe feedback to the dipole antenna 26. This AGC adjustment may also be used to set the signal level in accordance with communication system limits that have been established by a communication regulatory body.

In a similar manner to that just described, another of the bandpass filters, e.g., bandpass filter 151, can be selected with the switches 152 and 153 which will then select a different channel of the downstream signals. To enhance their selectivity, the bandpass filters 150, 151, 170 and 171 may be, for example, standing acoustic wave (SAW) filters.

The operation of the upstream signal-enhancing structure 162 proceeds in a manner similar to that described above for the downstream signal-enhancing structure 142. The upstream signal channels are generally different from the downstream signal channels (e.g., in the above example, the upstream band may be from 1930 to 1990 MHz) so that the selection frequencies of the high-pass filter 166, the bandpass filters 170 and 171 and the bandpass filter 176 differ accordingly from their respective downstream structures.

Power is applied (e.g., from a battery) to the repeater via the connector housing 95 of FIGS. 2 and 3. The repeater is then turned on with the switch 131 of FIG. 3. The power indicator 132 will then indicate (e.g., with a series of bars arranged as a bar graph) the signal strength (e.g., from signal 185) of the downstream signals that are reaching the repeater 140. The indicator 132 thus also functions as a received signal strength indicator (RSSI). The position of the repeater can be moved until the indicator 132 shows that the received signal is sufficient for repeater operation. Now the selection switch 133 can be repeatably operated until the display 134 indicates the desired signal channel has been selected (via, for example, the controller 180, the VCO 190, the channel switches 150 and 152 and the bandpass filters 150 and 151.

In another important feature of the invention, the repeater 140 also includes downstream and upstream circuit feedback paths 200 and 202 that respectively include phase/magnitude adjusters 204 and 206 which are each positioned between a pair of isolating attenuators (each labeled PAD) 207 that provide isolation (e.g., 15 dB) to enhance the accuracy of the adjusters. The phase/magnitude adjusters 204 and 206 are formed with variable attenuators and variable phase shifters that are responsive to control signals from the controller 180.

The feedback path 200 begins after the PA 158 and ends at a summer 208 (e.g., a capacitive summer) that is inserted ahead of the LNA 143. In a similar manner, the upstream feedback path 202 begins after the PA 178 and ends at another summer 210 that is inserted ahead of the LNA 163.

In an exemplary operation of the downstream feedback path 200, the controller 180 initially opens the switch 157 so that the PA 158 is not delivering power to the horizontally-polarized slot antenna 28. Accordingly, downstream signals from the dipole antenna 26 are present at the input of the signal detector 185 but there is now an absence of back lobe signals (and any other signals such as reflected signals) that enter the dipole antenna after being initiated by the slot antenna 28. That is, there is an absence of signals from the slot antenna that would otherwise feedback to the dipole antenna 26 and degrade the performance of the repeater 140 (e.g., by initiating signal oscillation).

With all back lobe feedback signals turned off, the controller 180 now monitors the signal power from the signal detector 185 and stores this power as a threshold power. In different repeater embodiments, the controller 180 may establish a power threshold somewhat higher than this measured power in order to permit a small amount of feedback to exist before it recognizes this as a condition that exceeds the threshold. Although other points along the downstream signal-enhancing structure 142 may be monitored in other repeater embodiments, this point is ahead of the filters 150 and 151 so that it sees a broad range of frequencies and is at the downconverted frequency which permits the use of a simpler and less expensive signal detector.

Subsequently, the controller closes the switch 157 to complete the downstream signal-enhancing structure 142 and monitors the signal power from the signal detector 185. If this signal power exceeds the power threshold, it is an indication that back lobe feedback signals from the slot antenna 28 are entering the dipole antenna 26 and endangering the stability of the downstream signal-enhancing structure 142.

If the signal power exceeds the power threshold, the controller 180 commands the phase/magnitude adjuster 204 to a setting that sufficiently alters the phase and attenuation of a cancellation signal 220 at the summer 208 so that it substantially cancels the back lobe feedback signals from the slot antenna 28 and thereby reduces the signal from the signal detector 185 below the established threshold. This will happen when the setting of the phase/magnitude adjuster 204 has caused the phase and amplitude of the cancellation signal 220 to substantially be opposite and equal respectively to the phase and amplitude of the back lobe feedback signals.

The feedback path 200 thus extracts a sample signal after the PA 158 and provides a feedback signal to the summer 208 that reduces the feedback from the slot antenna 28 to the dipole antenna 26. In an exemplary process, the controller 180 sends control signals 212 that place the phase/magnitude adjuster 204 in an initial condition in which it inserts zero attenuation and zero phase into the cancellation signal 220. The controller then successively steps the attenuation to its maximum (e.g., with an eight-bit control signal that commands a total of 256 attenuation steps). Next, the controller increments the phase shift by one step (e.g., with an eight-bit control signal that commands a total of 256 phase steps) and then successively repeats the attenuation steps. Subsequently, the controller increments the phase shift by another step and again successively repeats the attenuation steps.

This process is continued until the signal from the signal detector 185 drops below the signal threshold. Even with 256 possible attenuation steps and 256 possible phase steps that are each realized in 10 microseconds, this process takes less than 0.7 seconds to complete.

In the above processes, the controller 180 monitors the signal from the signal 185 to sense the presence of feedback signals. Various other signals may be monitored to provide this information. For example, a current sensor or detector 230 can be configured to monitor the amplitude of currents used by the downstream amplifier structures 142.

Similar to the processes described above, the controller can open the switch 157 and monitor a current sense signal from the current sensor 230 to establish a threshold signal. Subsequently, the controller closes switch 157 and interprets a signal from the current sensor 230 that exceeds the threshold as an indication of excessive feedback signals from the slot antenna 28 that are causing the PA 158 to draw excessive current. A similar process can be used to detect excessive current draw by the PA 178.

In another repeater embodiment, the controller 180 responds to a detector that senses the presence of feedback between the first and second antennas and adjusts gain of at least one of the downstream and upstream signal-enhancing structures 142 and 162 to eliminate the feedback. The gain is adjusted with the variable attenuators 144 and 164. Although at least one of the signal detectors 185 and 187 can serve as the detector, it has been found that the current sensor 230 is especially sensitive to circuit oscillation that results from feedback between the first and second antennas 26 and 28.

Accordingly, the controller 180 can respond to the current sensor 230 and adjust at least one of the variable attenuators 144 and 164 to maintain the sensed current below a predetermined current threshold (i.e., excessive current consumption indicates circuit oscillation and at least one of upstream and downstream gain is adjusted via automatic gain control to maintain a nominal current consumption).

The downstream signal-enhancing structure 160 and the upstream signal-enhancing structure 162 of FIG. 5 are preferably carried in the region of the broken-line box 136 on the circuit side of the circuit board 82 shown in FIG. 4. They are thus substantially enclosed by the wall structure 84.

Various other bidirectional repeater embodiments are included in the teachings of the invention. For example, either of the dipole antenna 26 and slot antenna 28 can be extended (preferably with its corresponding LNA) with a coaxial cable from the basic repeater body. This cable extension facilitates positioning of an antenna to increase the received signal strength (e.g., as indicated by the RSSI indicator 132 of FIG. 3). Either of the antennas may also be configured as an array of at least two antennas to facilitate electronic adjustment of azimuth and elevation.

In another repeater embodiment that makes use of antenna diversity, downstream elements (such as the antenna 26, the LNA 143 and the downconverter 147 may be duplicated so that there are first and second reception circuits. In operation, the repeater uses the reception circuit that is currently delivering the greatest receive power. Receive powers will often change rapidly (due, for example, to changes along the channel path) and this structure permits a dominant signal to be selected. Because a diversity gain of greater than 3 dB is realized, the probability of signal outage is significantly reduced and the channel approaches an additive white Gaussian noise channel.

In another repeater embodiment that makes use of antenna diversity, upstream elements (such as the antenna 26, the PA 178 and the upconverter 174 may be duplicated so that there are first and second transmission circuits. In operation, the repeater transmits through both transmission circuits and realizes 6 dB of upstream signal gain. Preferably, time delay is added in one transmission circuit (e.g., 1 microsecond) to insure that their transmission paths do not cause them to coherently add at the head end (22 in FIG. 1).

Repeaters of the invention can also be used as a cochannel repeater which facilitates transparent deployment in a communication network.

It has been found that the bidirectional teachings of the invention typically suppress coupling between repeater antennas by at least 50 dB which facilitates the realization of compact (i.e., reduced volume) repeaters. For exemplary signal frequencies in the region of 1900 MHz, the thickness of the structures shown in FIGS. 2 and 3 have been successfully reduced to less than 2 inches (i.e., substantially less than one wavelength). In its other dimensions, this structure is less than eight inches square and is easily accommodated, for example, on a windowsill of a building to thereby enhance communication between a head end (22 in FIG. 1) and a client communication device (24 in FIG. 1) that is located within the building.

Although the antennas of the invention are preferably orthogonally polarized, i.e., they have a polarization difference of 90°, it has been found that a polarization difference of between 60° and 120° also significantly reduces feedback between the repeater's antennas.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

We claim:

1. A bidirectional repeater, comprising:
 a first antenna arranged to have a first polarization;
 a second antenna arranged to have a second polarization that differs from said first polarization by a polarization difference;
 a first amplifier circuit configured to receive a first signal from said first antenna and to provide an amplified first signal to said second antenna; and
 a second amplifier circuit configured to receive a second signal from said second antenna and to provide an amplified second signal to said first antenna;
 further including:
 a first choke arranged to reduce feedback signals from said first antenna to said second antenna; and
 a second choke arranged to reduce feedback signals from said second antenna to said first antenna;
 wherein:
 said first choke is arranged to form a shorted first cavity and define a slot that electromagnetically couples said first cavity to said first antenna; and
 said second choke is arranged to form a shorted second cavity and define a slot that electromagnetically couples said second cavity to said second antenna.

2. The repeater of claim 1, wherein said polarization difference is between 60 and 120 degrees.

3. The repeater of claim 1, wherein said polarization difference is substantially 90 degrees.

4. The repeater of claim 1, wherein one of said first and second antennas is a dipole antenna.

5. The repeater of claim 1, wherein one of said first and second antennas is a slot antenna.

6. The repeater of claim 1, wherein one of said first and second antennas is a cavity-backed slot antenna.

7. The repeater of claim 1, wherein said first antenna is a dipole antenna having a first polarization and said second antenna is a cavity-backed slot antenna having a second polarization that is substantially orthogonal to said first polarization.

8. A bidirectional repeater, comprising:
 a first antenna arranged to have a first polarization;
 a second antenna arranged to have a second polarization that differs from said first polarization by a polarization difference;
 a first amplifier circuit configured to receive a first signal from said first antenna and to provide an amplified first signal to said second antenna; and
 a second amplifier circuit configured to receive a second signal from said second antenna and to provide an amplified second signal to said first antenna;
 further including:
 a first choke arranged to reduce feedback signals from said first antenna to said second antenna; and
 a second choke arranged to reduce feedback signals from said second antenna to said first antenna;
 wherein at least one of said first and second chokes comprises two chokes arranged on opposite sides of one of said first and second antennas.

9. The repeater of claim 8, wherein at least one of said first and second chokes is arranged to substantially surround one of said first and second antennas.

10. The repeater of claim 8, wherein said first antenna is a dipole antenna and said second antenna is a cavity-backed slot antenna.

11. The repeater of claim 8, wherein said polarization difference is substantially 90 degrees.

12. The repeater of claim 8, wherein each of said two chokes is arranged to form a shorted cavity and define a slot that electromagnetically couples said cavity to one of said first and second antennas.

13. The repeater of claim 8, wherein one of said first and second antennas is a dipole antenna positioned between said two chokes.

14. A bidirectional repeater, comprising:
a first antenna arranged to have a first polarization;
a second antenna arranged to have a second polarization that differs from said first polarization by a polarization difference;
a first amplifier circuit configured to receive a first signal from said first antenna and to provide an amplified first signal to said second antenna; and
a second amplifier circuit configured to receive a second signal from said second antenna and to provide an amplified second signal to said first antenna;
further including:
a first feedback circuit that extracts a first sample signal from a portion of said first amplifier circuit and provides a first feedback signal to another portion of said first amplifier circuit that reduces feedback from said second antenna to said first antenna; and
a second feedback circuit that extracts a second sample signal from a portion of said second amplifier circuit and provides a second feedback signal to another portion of said second amplifier circuit that reduces feedback from said first antenna to said second antenna.

15. The repeater of claim 14, wherein:
said first amplifier circuit includes a detector that senses the presence of antenna feedback signals from said second antenna; and
said first feedback circuit includes at least one of a variable phase shifter and a variable attenuator that, in response to said detector, alters at least one of phase and amplitude of said first feedback signal to substantially reduce said antenna feedback signal.

16. The repeater of claim 14, wherein:
said second amplifier circuit includes a detector that senses the presence of antenna feedback signals from said first antenna; and
said second feedback circuit includes at least one of a variable phase shifter and a variable attenuator that, in response to said detector, alters at least one of phase and amplitude of said second feedback signal to substantially reduce said antenna feedback signal.

17. The repeater of claim 14, wherein at least one of said first and second amplifier circuits includes:
a low noise amplifier;
a power amplifier;
a downconversion mixer and an upconversion mixer between said low noise amplifier and said power amplifier; and
at least one channel-selection filter between said downconversion and upconversion mixer.

18. A bidirectional repeater, comprising:
first and second antennas;
a first amplifier circuit configured to receive a first signal from said first antenna and to provide an amplified first signal to said second antenna;
a second amplifier circuit configured to receive a second signal from said second antenna and to provide an amplified second signal to said first antenna;
a first feedback circuit that extracts a first sample signal from a portion of said first amplifier circuit and provides a first feedback signal to another portion of said first amplifier circuit that reduces feedback from said second antenna to said first antenna; and
a second feedback circuit that extracts a second sample signal from a portion of said second amplifier circuit and provides a second feedback signal to another portion of said second amplifier circuit that reduces feedback from said first antenna to said second antenna.

19. The repeater of claim 18, wherein:
at least one of said first and second amplifier circuits includes a detector that senses the presence of antenna feedback signals between said first and second antennas; and
at least one of said first and second feedback circuits includes at least one of a variable phase shifter and a variable attenuator that, in response to said detector, alters at least one of phase and amplitude of at least one of said first and second feedback signals to substantially reduce said antenna feedback signals.

20. The repeater of claim 19, wherein said detector is a signal detector.

21. The repeater of claim 19, wherein said detector is a current sensor.

22. The repeater of claim 18, wherein at least one of said first and second amplifier circuits includes:
a low noise amplifier;
a power amplifier;
a downconversion mixer and an upconversion mixer between said low noise amplifier and said power amplifier;
a local oscillator that provides conversion signals to said downconversion and upconversion mixers; and
at least one channel-selection filter between said downconversion and upconversion mixers.

23. The repeater of claim 22, wherein at least one of said first and second amplifier circuits further includes a variable attenuator that establishes a power level of a corresponding one of said amplified first signal and said amplified second signal.

24. The repeater of claim 18, wherein:
said first antenna is arranged to have a first polarization; and
said second antenna is arranged to have a second polarization that differs from said first polarization by a polarization difference between 60 and 120 degrees.

25. The repeater of claim 18, wherein said first antenna is a dipole antenna having a first polarization and said second antenna is a cavity-backed slot antenna having a second polarization that is substantially orthogonal to said first polarization.

26. The repeater of claim 18, further including:
a first choke arranged to reduce feedback signals from said first antenna; and
a second choke arranged to reduce feedback signals from said second antenna.

27. The repeater of claim 18, wherein at least one of said first and second antennas is an antenna array.

28. The repeater of claim 18, further including a cable that couples at least one of said first and second antennas to said first and second amplifier circuits to facilitate positioning therebetween.

29. The repeater of claim 18, wherein said first antenna and at least an adjoining portion of said first amplifier circuit are duplicated to provide first and second reception circuits to thereby facilitate operational selection of one of said first and second reception circuits.

30. The repeater of claim 18, wherein said second antenna and at least an adjoining portion of said second amplifier circuit are duplicated to provide first and second transmission circuits that provide a plurality of transmitted signals.

31. A bidirectional repeater, comprising:
   a first antenna arranged to have a first polarization;
   a second antenna arranged to have a second polarization that differs from said first polarization by a polarization difference;
   a first amplifier circuit that, with a first gain, amplifies a first signal from said first antenna to thereby provide an amplified first signal to said second antenna;
   a second amplifier circuit that, with a second gain, amplifies a second signal from said second antenna to thereby provide an amplified second signal to said first antenna;
   a detector that senses the presence of feedback between said first and second antennas; and
   a variable attenuator in at least one of said first and second amplifier circuits that responds to said detector and adjusts at least one of said first and second gains to eliminate said feedback.

32. The repeater of claim 31, wherein said detector is a current sensor that senses currents in said repeater.

33. The repeater of claim 31, wherein said detector is a signal detector that senses signals in at least one of said first and second amplifier circuits.

34. The repeater of claim 31, further including a controller that adjusts said variable attenuator in response to said detector.

35. The repeater of claim 31, wherein at least one of said first and second amplifier circuits includes:
   a low noise amplifier;
   a power amplifier;
   a downconversion mixer and an upconversion mixer between said low noise amplifier and said power amplifier; and
   at least one channel-selection filter between said downconversion and upconversion mixer.

36. The repeater of claim 31, wherein said polarization difference is between 60 and 120 degrees.

37. The repeater of claim 36, wherein said first antenna is a dipole antenna and said second antenna is a slot antenna.

38. The repeater of claim 31, further including:
   a first choke arranged to reduce feedback signals from said first antenna to said second antenna; and
   a second choke arranged to reduce feedback signals from said second antenna to said first antenna.

39. The repeater of claim 38 wherein at least one of said first and second chokes is arranged to form a shorted cavity and define a slot that electromagnetically couples said cavity to at least one of said first and second antennas.

40. A bidirectional repeater, comprising:
   a first antenna arranged to have a first polarization;
   a second antenna arranged to have a second polarization that differs from said first polarization by a polarization difference;
   a first amplifier circuit that, with a first gain, amplifies a first signal from said first antenna to thereby provide an amplified first signal to said second antenna;
   a second amplifier circuit that, with a second gain, amplifies a second signal from said second antenna to thereby provide an amplified second signal to said first antenna;
   a detector that senses the presence of feedback between said antennas; and
   a variable attenuator in at least one of said first and second amplifier circuits that responds to said detector and adjusts at least one of said first and second gains to reduce said feedback.

41. The repeater of claim 40, wherein said detector is a current sensor that senses currents in said repeater.

42. The repeater of claim 40, wherein said first antenna is a dipole antenna, said second antenna is a slot antenna, and said polarization difference is between 60 and 120 degrees.

43. The repeater of claim 40, further including at least one choke positioned to reduce feedback signals between said first and second antennas and arranged to form a shorted cavity and define a slot that electromagnetically couples said cavity to at least one of said first and second antennas.

44. A bidirectional repeater, comprising:
   a first antenna arranged to have a first polarization;
   a second antenna arranged to have a second polarization that differs from said first polarization by a polarization difference;
   a first amplifier circuit configured to receive a first signal from said first antenna and to provide an amplified first signal to said second antenna;
   a second amplifier circuit configured to receive a second signal from said second antenna and to provide an amplified second signal to said first antenna; and
   at least one choke arranged to form a shorted cavity and define a slot that electromagnetically couples said cavity to one of said first and second antennas with said choke positioned to reduce feedback signals between said first and second antennas.

45. The repeater of claim 44, wherein said choke comprises two chokes arranged on opposite sides of one of said first and second antennas.

46. The repeater of claim 44, wherein said choke is arranged to substantially surround one of said first and second antennas.

47. The repeater of claim 44, wherein said first antenna is a dipole antenna having a first polarization and said second antenna is a cavity-backed slot antenna having a second polarization that is substantially orthogonal to said first polarization.

\* \* \* \* \*